Oct. 6, 1964

A. A. OLNEY ETAL 3,151,778

PROPORTIONING METER

Filed April 27, 1962

INVENTORS.
ALVIN A. OLNEY
ALLEN DIX TOVELL
BY
Christie, Parker & Hale
ATTORNEYS.

Oct. 6, 1964 A. A. OLNEY ETAL 3,151,778
PROPORTIONING METER
Filed April 27, 1962 2 Sheets-Sheet 2

3,151,778
PROPORTIONING METER
Alvin A. Olney, 4627 Pepperwood Ave., Long Beach,
Calif., and Allen Dix Tovell, 1150 Lorain Road, San
Marino, Calif.
Filed Apr. 27, 1962, Ser. No. 201,743
11 Claims. (Cl. 222—134)
(Filed under Rule 47(a) and 35 U.S.C. 116)

The invention relates to a proportioning meter for metering an additive liquid into a base liquid in a preselected volumetric ratio continuously during flow of the base fluid.

Conventional meters for metering an additive liquid into a base liquid during flow of the base liquid frequently function to inject the additive liquid into the base liquid at periodic intervals responsive to a predetermined total volumetric flow of the base liquid during the interval. As a result, the additive liquid is injected to the base liquid as a more or less discrete "dose" of additive liquid. This results in nonuniform mixing of the additive liquid with the base liquid so that there is variance in the volumetric proportion of additive liquid to base liquid at the discharge of the base liquid. This can be a very serious disadvantage where fungicides or other highly reactive materials are used as the additive liquid because a slight over proportion of the additive liquid in the base liquid as used can result in serious harm to the apparatus or plants on which the treated base liquid is used. Other conventional proportioning devices may inject the additive liquid into the base liquid in relation to time intervals rather than to actual volumetric flow of the base liquid, which does not take account of variations in volumetric flow of the base liquid during the time interval and results in inaccurate proportioning with the serious disadvantages described above. Typical examples wherein these problems arise are addition of liquid fertilizers to water, boiler compound liquids to boiler water, liquid chemicals to oil lines, and the like.

The inventive apparatus does not present the above problems and disadvantages. Additive liquid is supplied to the base liquid continuously during flow of the base liquid and according to a preselected volumetric proportion of additive liquid to base liquid. With the inventive apparatus, the additive liquid is not injected into the base liquid as a single dose but rather is continuously supplied to the base liquid. Moreover, the supply of the additive liquid to the base liquid is determined volumetrically in direct proportion to actual volumetric flow of the base liquid so that, although the volumetric ratio of additive liquid to base liquid remains a constant as preselected, the actual volume of additive liquid supplied to the base liquid is directly responsive to variations in volumetric flow of the base liquid in order to accurately maintain the preselected volumetric proportion of one to the other. In addition, the inventive apparatus is economical to manufacture, simple and reliable in operation, and of long life.

The inventive apparatus comprises a proportioning meter having a housing with a drive shaft rotatably mounted in the housing. A cam is mounted on the drive shaft for rotation with the drive shaft and for sliding movement along the drive shaft. The cam has an exterior working surface which has a spiral configuration in a plane perpendicular to the axis of the drive shaft with a retreat portion extending from the outermost radial extent of the spiral radially inwardly to the innermost radial extent of the spiral. A cam follower engages the working surface of the cam and is movably mounted on the housing with means for yieldably biasing the cam follower against the working surface of the cam for reciprocative motion of the cam follower responsive to rotation of the cam. A member is mounted on the housing for reciprocative motion and defines a fluid-tight chamber between the housing and the member of variable volume responsive to reciprocative displacement of the member toward and away from the housing. The member is operatively connected to the cam follower to be reciprocated thereby. Inlet valve means are mounted on the housing and communicate from the exterior of the housing to the chamber for opening for fluid flow into the chamber responsive to increase in volume of the chamber and for closing to prevent fluid flow out of the chamber responsive to decrease in volume of the chamber. Outlet valve means are mounted on the housing and communicate from the exterior of the housing to the chamber for opening for fluid flow out of the chamber responsive to decrease in volume of the chamber and for closing to prevent fluid flow into the chamber responsive to increase in volume of the chamber.

The drive shaft of the apparatus is connected to the output shaft of a conventional volumetric flow meter having a rotating output shaft which is rotatively driven responsive to fluid flow through the flow meter. The rotational speed of the drive shaft is directly proportional to the volumetric flow rate. The flow meter may be of the nutating disc type, as an example. The flow meter is disposed in the flow of the base liquid, and the rotation of the output shaft of the flow meter and the drive shaft of the pump apparatus, having the cam fixed thereto, is directly coupled to the volumetric flow rate of the base liquid. The cam in turn actuates the cam follower and the member. The inlet and outlet valves of the inventive apparatus function to intake additive liquid through the intake valve into the chamber and to discharge it from the chamber through the outlet valve to the flow of base liquid in response to the movement of the member. The ratio of additive liquid to base liquid on a volume basis is preselected by changing the cam position to change the stroke of the cam follower and, consequently, the displacement of the member actuated by the cam follower. With this apparatus, additive liquid is supplied continuously to flowing base liquid in precise preselected volumetric proportion over a wide range of flow rates of the base liquid.

The inventive apparatus will be fully understood from a reading of the following description in conjunction with the accompanying drawings, in which.

Figure 1:
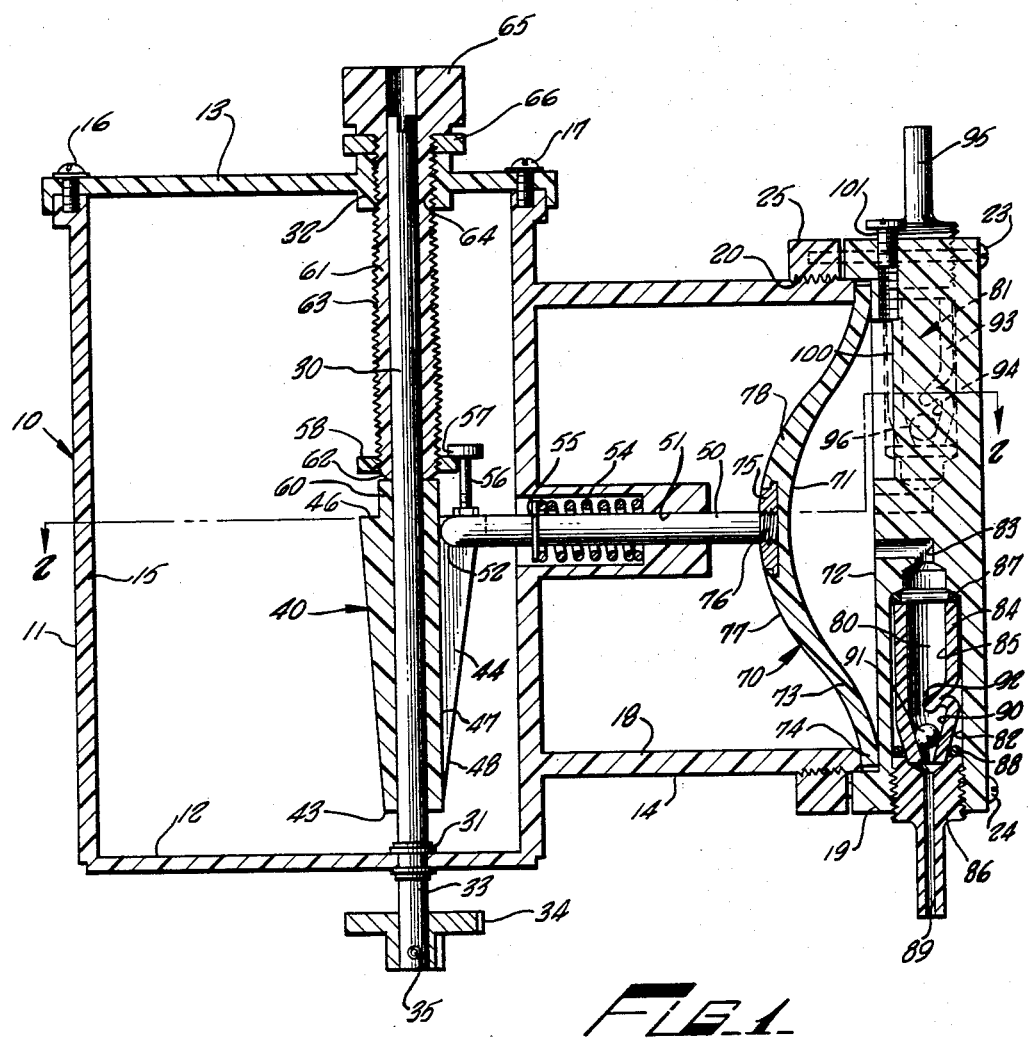
FIGURE 1 is an elevational view of the inventive apparatus partially in section.

Referring to FIG. 1, 10 designates a housing of the inventive apparatus. Housing 10 includes a cam portion 11 and a pump portion 14. Cam portion 11 of the housing has a hollow, cylindrical body portion 15 which has a closed bottom 12 and a cover 13 removably attached to the body portion in conventional manner by means of screws 16, 17 extending through the cover and threadedly received in body portion 15. Pump portion 14 of the housing, as illustrated, includes a hollow, cylindrical body portion 18 which is mounted on body portion 15 and extends therefrom with its central axis at right angles to the central axis of body portion 15. A valve plate 19 is removably mounted on the end of pump portion 14 by means of screws, such as screws 23, 24, which extend through valve plate 19 and threadedly engage a retaining ring 25 mounted on the pump portion by means of threaded engagement therewith at 20 to close the end of pump portion 14 disposed remotely from body portion 15 of the cam portion of the housing.

An elongated drive shaft 30 is rotatably mounted within cam portion 11 of the housing by means of a bearing 31 in bottom 12 and, as explained below, by a boss 32 in cover 13 and a sleeve 61. Drive shaft 30 extends exteriorly of housing 10 at 33. A gear 34 is fixed to an exteriorly extending portion 33 of the drive shaft in conventional manner by means of a pin or setscrew 35 so that gear 34 and drive shaft 30 rotate as a unit. Gear 34 is connected to the rotating output shaft of a conventional volumetric flow meter (not shown) disposed in the flowing base liquid. The flow meter is of the type which has a rotating output shaft which is rotatively driven in response to flow of a base liquid through the flow meter at a rotational speed directly proportional to the volumetric flow rate of base liquid. The flow meter may be of the propeller, vane, gear, or piston type, but it is preferred that it be of the nutating disc positive displacement type because of the accuracy and high torque output of this type of flow meter, such accuracy being an important factor in proper operation of the inventive apparatus. Since the flow meter is purely conventional, it is not illustrated. Drive shaft 30 is thus rotatively driven through gear 34 responsive to flow of base liquid at a rotational speed which is directly proportional to the volumetric flow rate of such base liquid through the flow meter.

Figure 2:
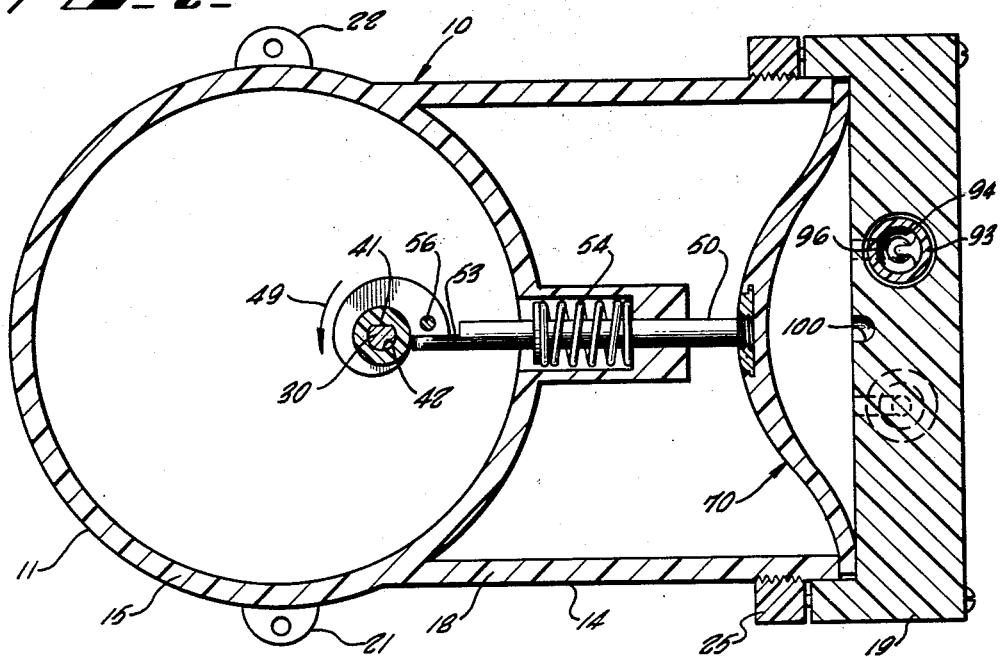
FIGURE 2 is a plan sectional view along the line 2—2 in FIGURE 1.
Figure 3:
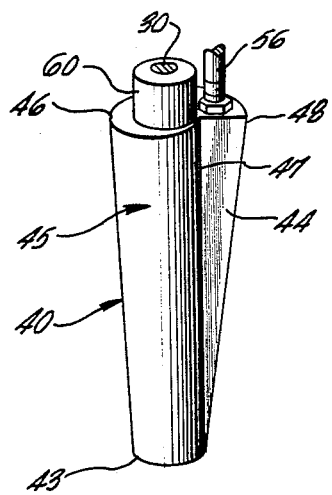
FIGURE 3 is a perspective view of an element of the inventive apparatus.

A cam 40 is mounted on drive shaft 30 within cam portion 11 of housing 10. Cam 40 is mounted on drive shaft 30 so that it rotates with drive shaft 30. Also, cam 40 is slidable on drive shaft 30 in the direction of the longitudinal axis or axis of rotation of the drive shaft. This is accomplished by means of a flat 41 (FIG. 2) on drive shaft 30, extending the length of the drive shaft within the housing portion 11, and by a mating central hole 42 extending longitudinally through cam 40. Such mating configuration keys cam 40 to drive shaft 30 so that they rotate as a unit while cam 40 is still free to slide on drive shaft 30 in the direction of the elongate extent of the drive shaft. Cam 40 is generally conically shaped as illustrated in FIGS. 1 and 3 and is elongated in the direction of the longitudinal axis of drive shaft 30. As illustrated, cam 40 has its smaller end 43 nearest the bottom 12 of the cam portion of housing 10, but it is within the scope of the invention that the smaller end of cam 40 may be disposed upwardly of housing portion 11. As best shown in FIGS. 2 and 3, the exterior working surface 45 of cam 40 has a spiral configuration in a plane perpendicular to the axis of rotation of drive shaft 30 with a retreat portion 44 which extends from the outermost radial extent or first portion 48 of the spiral inwardly to the innermost radial extent or second portion 47 of the spiral. The retreat portion 44 extends the length of cam 40 for a preferred embodiment of the invention is illustrated as lying in a plane in which the axis of drive shaft 30 lies. The radial extent of retreat portion 44 between the outermost and innermost radial extents of the spiral configuration varies at a uniform linear rate relative to position along the elongate extent of cam 40 from a maximum at end 46 of the cam to a minimum at end 43 of the cam. The minimum extent of retreat portion 44 at end 43 of the cam is, in fact, zero so that end 43 is circular in configuration in a plane perpendicular to the axis of rotation of drive shaft 30. The innermost radial extent 47 of the spiral configuration is constant throughout the length of retreat portion 44 so that the length of the generating radius of the spiral has a rate of change relative to its angular position about the axis of drive shaft 30 which is a maximum rate of change at end 46 of the cam where the radial extent of retreat portion 44 is a maximum and varies linearly to a minimum rate of change which is, in fact, zero at end 43 of the cam where the radial extent of retreat portion 44 is a minimum. In addition, the rate of change of the length of the generating radius of the spiral is a constant rate of change for any given position along the length of cam 40, although, as stated above, as position along the length of cam 40 varies, the rate of change, although a constant rate of change for any given position, varies linearly or at a constant rate relative to position along the elongate extent of cam 40. It is important that the rate of change of generating radius for the spiral configuration at any given point along the elongate extent of cam 40 be linear so that a cam follower will be displaced by said spiral at a uniform rate of displacement. It is also important that the maximum value of the generating radius vary linearly or at least according to a predetermined characteristic, over the elongate length of the cam in order that desired porportioning by the apparatus can be easily preselected.

A cam follower 50 in the form of a straight shaft extends between the interior of pump portion 14 and the interior of cam portion 11 of the housing and is slidably carried on the housing for reciprocative motion by means of a bearing 51. As illustrated, bearing 51 is provided in a boss section extending toward the pump portion 14 from a portion of the housing between cam portion 11 and pump portion 14. End 52 of cam follower 50 engages the working surface 45 of cam 40 and is rounded as illustrated in FIG. 1. As shown in FIG. 2, end 52 of the cam follower has an offset planar face 53 of greater extent in the direction of the axis of the cam follower than the maximum radial extent of retreat portion 44 in order that retreat portion 44 effects a quick return of cam follower 50. Face 53 lies in a plane which includes the axis of rotation of drive shaft 30, and cam follower 50 extends radially from such axis of rotation. Alternatively, follower end 52 may include a roller or ball bearing engageable with cam 40 to reduce frictional wear of cam 40. A compression spring 54 and stop flange 55, in the form of a peripheral snap ring, fixed to the cam follower yieldably bias end 52 of the cam follower against working surface 45 of cam 40. It is apparent that cam follower 50 reciprocates responsive to rotation of cam 40 in the direction indicated at 49 in FIG. 2 and that the stroke of its reciprocation depends upon the position along the elongate extent of cam 40 at which end 52 of the cam follower is positioned. As illustrated in FIG. 1, the stroke of cam follower 50 is approximately the maximum stroke possible.

Figure 5:
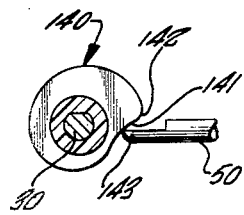
FIGURE 5 is a plan view of a modified control cam.

The retreat portion 44 of cam 40 is shown in FIG. 3 as being planar. This is proper for a general purpose pump which is often required to pump fluids of different viscosity. In many cases, however, the pump will be required to pump a liquid having a high viscosity. Then the preferred cam has a retreat portion which slants steeply, but not discontinuously, between cam portions 47 and 48. With such a cam, shown in FIG. 5, the cam follower 50 is not induced to move substantially instantaneously over an intake stroke. When a viscous liquid is the additive fluid, the rate of flow of the liquid into the pump chamber may be less than the rate at which pump chamber volume tends to increase when the cam follower 50 is driven to follow a planar retreat surface such as surface 44. In such a case, the flow rate of the liquid controls movement of the diaphragm 70 since atmospheric pressure against the side of diaphragm 70 toward cam 40 forces diaphragm 70 back toward the vacuum which is induced in the pump chamber. The vacuum is induced when diaphragm 70 moves faster than the additive liquid can follow even though the liquid is drawn through the inlet valve by the action of such vacuum. Where the viscosity of the additive liquid controls the movement of follower 50, there is a period when follower 50 does not maintain contact with cam 40 if a planar retreat 44 is used, and during this period the cam 40 may be indexed so that when the follower 50 does make contact with the cam 40 the diaphragm 70 is in a position other than its predetermined "bottom dead center" position. As a result, the pump will not intake a volume of additive fluid corresponding to the volume to be pumped as determined by the position of cam 40 longitudinally of shaft 30. A steep but continuously curved retreat portion assures that there is no period when follower 50 is disengaged from cam 40 and, accordingly, diaphragm 70 always returns to a predetermined position so that the volume of additive fluid pumped may be accurately preselected with confidence that the pump will deliver a known volume of liquid at every rotation of shaft 30. Cam 140 has a retreat portion 141 inclined to a radius through shaft 30 and extends continuously between a high first portion 142 and a low or base portion 143.

Means are provided for moving cam 40 slidably on drive shaft 30 and releasably holding it in a preselected position relative to the drive shaft and to cam follower 50 in order that the reciprocative stroke of the cam follower may be preselected according to the position of the cam relative to the cam follower. As illustrated in FIG. 1, cam 40 has a hub portion 60. An elongated sleeve 61 is disposed freely and slidably about drive shaft 30 so that drive shaft 30 rotates freely and independently with respect to sleeve 61, which is stationary during operation of the apparatus and which serves as a bearing to rotatably mount the upper portion of drive shaft 30. End 62 of sleeve 61 engages hub 60 of the cam. Sleeve 61 has external threads 63 extending throughout its elongate length and is threadedly received at 64 in boss 32 in cover 13 of cam portion 11 of the housing. Sleeve 61 extends exteriorly of housing 10 and terminates in a knurled head 65 disposed exteriorly of the housing. A lock nut 66 is threadedly disposed on threads 63 of the sleeve so that lock nut 66 may be tightened against the housing to jam the threaded engagement at 64 and thereby releasably secure sleeve 61 in a preselected position. Since cam 40 is generally conically shaped with its small end 43 down, the engagement between working surface 45 of the cam and end 52 of cam follower 50 results in a upwardly directed screwing tendency of the cam responsive to rotation of the cam so that, through this tendency of the cam to screw upwardly, engagement is maintained between end 62 of sleeve 61 and hub 60 of the cam. In addition to the screwing feature, a suitable compression spring may be disposed between bottom 12 of the housing and end 43 of the cam with a suitable thrust washer between end 43 of the cam and the end of the spring in order that the spring biases cam 40 upwardly to maintain engagement between end 62 of the sleeve 61 and hub 60. A screw or vertical post 56 is threadedly mounted on end 46 of the cam with a locking nut engaging the cam. The post 56 extends upwardly parallel to drive shaft 30 to a head 57 which overlies a ring 58 threadedly received on sleeve 61 and releasably held in fixed position longitudinally of sleeve 61 in conventional manner, as by means of a set-screw (not shown) threaded through ring 58 and engaging sleeve 61. The engagement between flanged head 57 and sleeve flange 58 causes cam 40 to follow sleeve 61 when sleeve 61 is screwed upwardly. When flanges 57 and 58 are engaged, a small clearance is provided between ends 60 and 62 of the cam and sleeve, respectively. This clearance provides that cam 40 is freely rotatable relative to the lower end 62 of sleeve 61 and no binding occurs between these elements. With this arrangement, it is apparent that cam 40 can be moved slidably along drive shaft 30 and releasably held in a preselected position on the drive shaft relative to the drive shaft and to cam follower 50 by means of simply loosening lock nut 66, manually rotating head 65 until the desired position of cam 40 is reached and then tightening lock nut 66 against cover 13 to releasably lock sleeve 61 in such position.

A generally dome-shaped flexible diaphragm pumping member 70 is disposed within the interior of pump portion 14 of the housing with its concave side 71 nearest the inside surface 72 of valve plate 19. Diaphragm 70 has a circular periphery 74 engaged between the generally circular open end of housing pump portion 14 and valve plate 19 in fluid-tight relation. The concave side 71 of diaphragm 70 and the interior side 72 of valve plate 19 define a fluid-tight pumping chamber which is variable in volume depending on the condition of the deformable diaphragm pumping member 70. Diaphragm 70 preferably is made of material such as neoprene or polyethylene, which not only has the qualities of flexibility and durability but is also chemically inert to most substances. A threaded flanged nut 75 is imbedded in conventional manner at the geometrical center of diaphragm 70, and end 76 of cam follower 50 is threadedly received in nut 75 to connect such end 76 of the cam follower to the geometrical center of the convex side 77 of diaphragm 70. It is thus apparent that, as cam follower 50 reciprocates responsive to rotation of cam 40, the central portion of diaphragm 70 similarly reciprocates toward and away from surface 72 of valve plate 19 to decrease and increase the volume of the chamber defined between the diaphragm and the valve plate. The central portion 78 of the diaphragm is substantially thicker than the peripheral edge portion 73 of the diaphragm in order that as the diaphragm moves toward and away from surface 72 of valve plate 19, the central portion 78 is always concave toward surface 72 of the valve plate and does not reverse its curvature at the reversal of direction of movement of its central portion, as would be the case with a diaphragm of uniform thickness. The prevention of such folding or reversing of the curvature of the diaphragm is significant because such reversing of curvature would absorb a small portion of the displacement of cam follower 50 in the flexing itself rather than in movement of the diaphragm and the desired accuracy of the pump would be impaired. The phenomenon of diaphragm reversal is not necessarily a repetitive phenomenon and it is therefore impossible to completely compensate for such action when it does occur. Eliminating such a random variable from the operative linkage of the moving parts of the pump assures that pump output characteristics will be accurately controlled by the cam 40. With central portion 78 of the diaphagm thicker than the periphery 74, reciprocatory movement of the center of the diaphragm results in flexure of the diaphragm in its thinner peripheral portion 76 without any of the above described reversal of curvature of the diaphragm.

The partition between housing portion 11 and 14 may be open to flow of the fluid contained in the housing between these two portions. This feature provides that the convex side of the diaphragm 70 is not subjected to undesired loading by fluid compressed in housing portion 14 as the diaphragm moves in an intake stroke. In such manner the diaphragm responds quickly and accurately to reciprocation of cam follower 50.

An inlet valve 80 is disposed in valve plate 19 and communicates between the exterior of housing 10 and the interior of the chamber between diphragm 70 and valve plate 19, hereinafter referred to only as the chamber. An outlet valve 81 is disposed in valve plate 19 and communicates between the exterior of housing 10 and the interior of the chamber. Additive liquid which is to be added to flowing base liquid is supplied in conventional manner through a supply conduit inlet valve 80, and a discharge conduit is secured in conventional manner to outlet valve 81 and communicates to the flowing base liquid so that additive liquid is intaken into the chamber through inlet valve 80 and discharged from the chamber to the flowing base liquid through outlet valve 81. Inlet valve 80 opens and permits liquid flow into the chamber responsive to increase in volume of the chamber and closes to prevent flow of additive liquid out of the chamber responsive to decrease in volume of the chamber. In converse manner, outlet valve 81 opens to permit flow of additive liquid out of the chamber responsive to decrease in volume of the chamber and closes to prevent flow of additive liquid into the chamber responsive to increase in volume of the chamber. Valves 80 and 81 are of the fluid-flow responsive or check valve type.

Referring to inlet valve 80, a cylindrical recess 82 is defined within valve plate 19 and communicates to the exterior of the valve plate through duct 83 to the chamber. A generally tubular valve body 84 having a generally cylindrical exterior surface and a central internal longitudinal passageway 85 extending therethrough is disposed within recess 82 with passageway 85 communicating with duct 83. Passageway 85 also communicates to the exterior of valve plate 19 through a tube coupling 86 which is threadedly received in valve plate 19. Tube coupling 86 is connected in conventional manner to a supply conduit (not shown), which communicates to a supply tank (not shown) of additive liquid to be added to the base liquid. A conventional O-ring 87 is disposed between one end of valve body 84 and the bottom of cyclindrical recess 82 and is compressed therebetween by tightening tube coupling 86 against the other end of valve body 84 in order to effect a fluid-tight seal between the valve body 84 and valve plate 19. In similar manner, a second O-ring 88 is disposed between the other end of valve body 84 and cylindrical recess 82 and is compressed therebetween by tube coupling 86 to effect a fluid-tight seal between the other end of valve body 84 and recess 82. With this arrangement, it is apparent that liquid flow into the chamber is effected through passageway 89 in tube coupling 86, through internal passageway 85 in valve body 84, and through duct 83 in the valve plate. The valve internal passageway 85 defines a generally conical seating face 90, at the end of valve body 84 remote from duct 83, which diverges as it extends toward duct 83 in the direction of the liquid flow through the valve into the chamber. A spherical valve closure member or ball 91 is disposed on seating face 90 in engagement therewith and is freely movable away from engagement with seating face 90 until it engages projection 92 which extends into passageway 85 and serves to retain valve ball 91 in proximity to seating face 90. Seating face 90 is ground so that a circumferential segment of valve ball 91 mates in close engagement with a spherically ground portion of seating face 90 to effect a liquid-tight seal therewith. Inlet valve 80 is disposed in vertical orientation with valve ball 91 at the bottom so that the weight of the valve ball tends to urge the valve ball into engagement with the seating face as the normal condition of the valve ball. When the volume of the chamber begins to increase, valve ball 91 is unseated from seating face 90 because of a reduced fluid pressure in the pumping chamber and opens the inlet valve to permit flow of additive liquid into the chamber. When the volume of the chamber begins to decrease, valve ball 91 is urged against the ground portion of the seating face by fluid pressure developed in the pump chamber to close the inlet valve to prevent liquid flow out of the chamber. The container (not shown) of additive liquid may be disposed at a lower elevation than the inlet valve and thereby help urge valve ball 91 into seating engagement with seating face 90 responsive to decrease in volume of the chamber. Valve body 84 and valve ball 91 are made of glass, of plastic materials, or of metallic materials as discussed below. Valve body 84 is removable from valve plate 19 by unscrewing tube coupling 86 in order that valve bodies with different sizes and weights of valve balls may be utilized for different densities of additive liquid for proper operation of the valve; for example, a heavier valve ball 91 may be utilized for denser additive liquids. Outlet valve 81 is in all respects identical with inlet valve 80 except that valve body 93 is oriented with seating face 94 nearest the duct communicating through valve plate 19 to the chamber and diverges as it extends in the direction of liquid flow from the chamber through the valve to the exterior of the housing. Outlet valve 81 is oriented vertically and its tube coupling 95 is connected in conventional manner to a discharge conduit (not shown) which communicates to the flowing base liquid to which the additive liquid is to be added. Outlet valve 81 is closed responsive to increase in volume of the chamber to prevent additive liquid from flowing into the chamber through outlet valve 81 and opens responsive to decrease in volume of the chamber to permit additive liquid to flow out of the chamber and through outlet valve 81 to the base liquid as described above. Other types of valves may be utilized, such as flap valves or disc valves.

It is important that the inlet and outlet valves open and close with a positive action responsive to the events described above for accuracy of the apparatus, and the above described ball valves are preferred. An object of this invention is to provide a proportioning pumping apparatus which is accurate in operation. The cam 40 described above is such as to provide a predetermined output characteristic for the pump over a range of output flow rates relative to the flow rate of the fluid to which the pumped fluid is to be added. The apparatus of this invention is capable of handling fluids which have high degrees of chemical activity. Such additive fluids often must be metered very carefully as to quantity. It is therefore desirable that the output of the pump very closely follow the predetermined characteristic incorporated into the configuration of cam 40. In addition to the requirement that the diaphragm 70 move in response to reciprocation of cam follower 50, it is also desired that the operation of valves 80 and 81 reflects the reciprocation of cam follower 50, as manifested by movement of diaphragm 70, as closely as possible.

Positively actuated mechanically operated valve means may be provided in conjunction with the drive shaft 30 to regulate inlet and outlet of the additive fluid to and from the pump chamber, but such valves would be subject to attack by the chemically active fluid which the apparatus may be required to handle. Accordingly, the fluid pressure responsive check valves described above are preferred. Such valves are contained within the ducting of the pump. Also, such valves provide operative flexibility as described below.

In order to assure that the proportioning pump discharge exactly the quantity of fluid associated with a preselected position of cam 40 on shaft 30, the valves 80 and 81 must operate as soon as the diaphragm reverses its flexing motion as regulated and determined by reciprocation of the cam follower shaft 50. It is contemplated that a pump as provided by this invention may be required to pump several different fluids at different times. Each of these fluids may have a different density. Accordingly, it is a feature of this invention that the check valve assemblies for the inlet and outlet ducts of the pump for one fluid of a given density be removable so that similar valve assemblies specifically matched to the density of a different fluid may be inserted into the valve plate 19.

The ball included as a part of a check valve assembly should be of a density such that it does not float on a fluid passing through the valve, but neither should the ball be so heavy as to seek a seat with conical portion 90 as such fluid passes through the valve. If the ball tends to float on the additive fluid, the valve will tend to open prematurely such that the valve will not be responsive to the fluid pressure changes associated with movement of diaphragm 70. If the ball is too heavy with respect to the density of the additive fluid, then the valve will tend to close before the diaphragm 70 reaches its limit of travel on either the intake or discharge phase of a pumping cycle. Since the valves are removable from the valve plate 19, it is possible to provide a plurality of matched pairs of valve assemblies, each pair of assemblies being adapted to regulate the flow of a fluid having a density within a predetermined range of densities associated with such pair of assemblies. All of the valves of the plurality are identical in external dimensions, but the nature of the balls varies between different pairs of assemblies. The materials from which the balls are fabricated and the sizes of the balls are varied to match each pair of valve assemblies to a particular range of densities of additive fluid. The following table, setting forth several acceptable materials, illustrates the various valve characteristics obtainable by such variation.

*Table I*

| Material: | Specific Gravity |
|---|---|
| Polyethylene (low density) | .91–.97 |
| Polystyrene | 1.05–1.08 |
| Nylon | 1.09–1.14 |
| Methyl methacrylate | 1.19 |
| Polyvinyl chloride | 1.15–1.65 |
| Polytetrafluoroethylene (Teflon) | 2.1–2.3 |
| Polytrifluorochloroethylene (Kel-K) | 2.1 |
| Aluminum | 2.00–2.80 |
| Stainless seel (gold plated) | 7.75 |

These various materials have best results when used with a fluid having a density somewhat less than the material. In cases where several materials have equal density, the chemical properties may determine which is best suited for use with a given additive fluid.

As indicated by Table I, there is a considerable difference between the densities of aluminum and stainless steel. In order to provide a continuous range of balls of various densities, a steel core can be covered with a suitable plastic, such as polytetrafluoroethylene, to form a composite valve ball having the desired composite density. In cases where the valve ball is formed of a metallic material, the ball should be gold plated to resist reaction with corrosive chemicals.

The provision of several pairs of valve sets adopted for use with a specific type of fluid results in extended and enlarged utility of the pump. The pump may be used with a lightweight fluid on one day and with a heavy fluid hydrocarbon on the next day, yet by changing the valve assemblies the pump discharge will accurately follow the setting of the cam 40 axially of shaft 30. The interchangability of valve assemblies further means that a standard pump structure may be tailored to fit the requirements of a particular user.

A vent 100 communicates between the chamber and the exterior of the valve plate 19. Vent 100 is closed at one end by means of a vent screw 101 threadedly received in valve plate 19 which opens the vent when the vent screw is removed and closes the vent to atmosphere when the vent screw is in place as illustrated. The purpose of vent 100 is to permit the chamber to be completely filled with additive liquid without air pockets, this being accomplished by removing vent screw 101, effecting a discharge stroke of diaphragm 70, and when additive liquid appears at the top of the vent replacing vent screw 101 to seal the vent from atmosphere, the chamber then being filled with additive liquid without air pockets and consequently in condition for precise operation.

Figure 4:
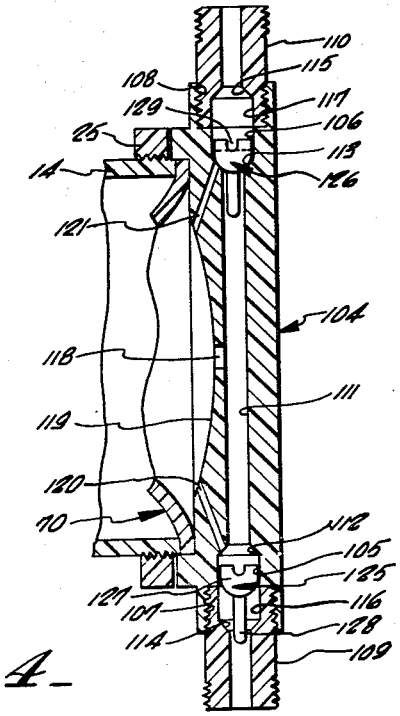
FIGURE 4 is a fragmentary cross-sectional elevation of the apparatus showing a second preferred valving means.

An alternate preferred embodiment of the valving mechanism for the differential pump is illustrated in FIGURE 4. The valve plate 104 is provided with spaced apart inlet and outlet valve recesses 105 and 106, respectively, which are threaded as at 107 and 108 to receive nipples 109 and 110. Suitable inlet and outlet ducts for the additive fluid are connectable to nipples 109 and 110, but since they do not form a portion of this invention they are not illustrated. As illustrated, valve recesses 105 and 106 are spaced diametrically of each other in valve plate 104 and are joined by a duct 111 having a cross-sectional area less than the diameter of recesses 105 and 106. Shoulders 112 and 113 are provided around the openings of duct 111 into recesses 105 and 106, respectively. Similar shoulders 114 and 115 are provided in recesses 116 and 117 of inlet and outlet nipples 109 and 110, respectively. A duct or opening 118 is formed from duct 111 into communication with a concave recess 119 formed in valve plate 104 and opening toward diaphragm 70. Auxiliary pressure relief ducts or passageways 120 and 121 of small diameter extend from recess 119 into valve recesses 105 and 106, respectively.

Reciprocable valve plugs 125 and 126 are disposed in mating pairs of recesses 105, 116, and 106, 117, respectively. Plugs 125 and 126 are identical so only plug 125 will be described in detail. Plug 125 has an enlarged head 127 which is disposed in the pair of recesses 105, 116. The diameter of head 127 is sufficient to engage the shoulders 112 and 114 defining the limits of reciprocation of plug 125. One end of head 127 is rounded off into an elongated guide finger 128. The rounded portion of head 127 comprises the seating portion of plug 125 with shoulder 114. The finger 128 is engaged within the fluid duct of nipple 109. The finger 128 of plug 126 is engaged in duct 111 whereby the head of plug 126 seats with shoulder 113 to seal duct 111. The length of finger 128 is such that it is not disengaged from the duct of nipple 109 when head 127 is engaged with shoulder 112. Head 127 has transverse recesses 129 in its end opposite from finger 128. Recesses 129 provide that the plugs 125 and 126 do not seal duct 111 or the duct in nipple 110 when they reach the upper limit of reciprocation in the configuration shown in FIGURE 4.

In a preferred form of the invention the valve plugs 125 and 126 are fabricated of Du Pont "Viton" rubber, a synthetic rubber which is very resistant to chemical action.

The operation of the valves is effected by bypass passages 120 and 121. Passage 120 communicates with recess 105 at shoulder 112, or at the "open" limit of travel of plug 125. Passage 126 communicates with recess 106 at shoulder 113, or at the "closed" limit of travel of plug 126. As diaphragm 70 moves to the left in the apparatus configuration shown in FIGURE 4, a reduced pressure area is produced between diaphragm 70 and valve plate 104. This reduced pressure is manifested on valve plug 125 through duct 111 and through passage 120. The same reduced pressure is manifested at plug 126 through duct 111 and through passage 121. Accordingly, plug 125 is raised from seating engagement with shoulder 114 whereby additive fluid may flow into the volume between diaphragm 70 and recess 119, and plug 126 is forcibly engaged in seating relation with shoulder 113 whereby additive fluid previously discharged from the pump is prevented from reentering the pump. When diaphragm 70 moves to the right on a pumping movement, the increased pressure of the additive fluid in the pump effects a reverse process such that plug 125 is seated and plug 126 is unseated.

The communication between recess 119 and valve recesses 105 and 106 is shorter by way of passages 120 and 121 than by way of duct 111. Accordingly, pressure changes resulting from movement of diaphragm 70 are manifested immediately at the plugs 125 and 126 so that operation of the valves exactly follows diaphragm movement. The result is that the volume of additive fluid pumped per revolution of shaft 33 is quite exactly related to the position of cam 40 longitudinally of shaft 30.

Since plug 126 may have a tendency to wedge itself into engagement with shoulder 113 by virtue of its inherent elasticity when a reduced pressure occurs in duct 111, passage 121 opens into the seating shoulder 113 so that the first manifestation of an increased pressure at recess 119 forces plug 126 loose from such wedging action. This means that excessive pressures are not reflected on diaphragm 70 and the life of the diaphragm is thereby extended.

As described above, diaphragm 70 is made of material such as neoprene or polyethylene, and the valve bodies, valve balls and valve plugs are made of glass, plastic, or plastic covered metal. The remainder of the apparatus, except for compression spring 54 or as stated, is made of plastic such as Delrin, which is preferred because of manufacturing economies which can be effected through the use of such material, its chemical inertness and durability, and the fact that it is not effected by water. Valve plate 19 is preferably made of transparent plastic so that visual observation of the chamber may be made from the exterior of the apparatus.

In operation, the inventive apparatus is mounted directly on a conventional volumetric flow meter by means of mounting lugs 21, 22, and gear 34 is connected to the rotating output shaft of such flow meter so that drive shaft 30 and cam 40 are rotatively driven by the flow meter responsive to flow of base liquid through the flow meter as described above. A supply conduit for additive liquid is connected to inlet valve 80 and a discharge conduit for the additive liquid is connected to outlet valve 81 and communicates to the flowing base liquid. Cam 40 is then set at a preselected vertical position relative to cam follower 50 as described above so that the discharge of additive liquid from the chamber through outlet valve 81 is a preselected volume per rotation of cam 40. Since the speed of rotation of cam 40 is directly proportional to the volumetric flow rate of the base liquid, the additive liquid is injected into the base liquid in a constant preselected volumetric ratio regardless of the actual volumetric flow rate of the base liquid or fluctuations in such flow rate. This is possible because such changes in base liquid flow rate are directly reflected in the rotation of cam 40 and in the total volumetric discharge from the chamber through outlet valve because of the quick response of the inlet and outlet valves. In this manner, the actual ratio, on a volume basis, of additive liquid injected into base liquid is maintained at a constant preselected ratio regardless of changes in the volumetric flow rate of the base liquid, and the additive liquid is injected continuously during flow of the base liquid.

While the invention has been described above in conjunction with specific illustrated preferred embodiments, this has been by way of example and should not be considered as limiting the scope of the invention.

We claim:

1. Apparatus for pumping a predetermined amount of an additive fluid to a preselected volume of a base fluid in combination with metering means for metering flow of the base fluid in a conduit, said metering means having an output means cyclically movable in response to flow of the base fluid through said metering means, the apparatus comprising a housing, a shaft rotatably disposed in the housing and operatively connected to the output means of the metering means for rotation thereof, a cam mounted on the shaft in the housing, a pump diaphragm mounted in the housing, cam follower means mounted to the diaphragm and continuously engageable with the cam, a valve plate mounted to the housing adjacent the diaphragm and defining a pump chamber between the diaphragm and the valve plate, the diaphragm bounding a portion of the pump chamber, the cam having a first portion corresponding to a predetermined position of the diaphragm away from the valve plate and a second portion corresponding to a position of the diaphragm toward the valve plate, means connected to the cam for moving the cam whereby movement of the cam follower between the first and second cam portions is altered in extent, the extent of movement of the cam follower determining the change in the volume of the pump chamber per rotation of the shaft, and inlet and outlet valve means in the valve plate for entrance and egress of additive fluid to and from the valve chamber in response to movement of the diaphragm away from and toward the valve plate, the valve means being adapted for operation upon manifestation of a reversal of movement of the diaphragm relative to the valve plate.

2. Apparatus according to claim 1 wherein the cam is elongated in the direction of the shaft upon which it is mounted and the cam has a spiral configuration in a plane perpendicular to the elongate extent of the shaft, the first portion of the cam being the outermost radial extent of the spiral and the second portion of the cam being the innermost radial extent of the spiral, the second portion of the cam being of constant radius along the length of the cam in the direction of the shaft, the radial extent of the cam first portion from the shaft varying linearly along the elongate extent of the cam.

3. Apparatus according to claim 2 wherein the cam includes a retreat portion between the cam first and second portions, the retreat portion being oriented radially of the cam along the elongate extent of the cam.

4. Apparatus according to claim 2 wherein the cam includes a retreat portion extending continuously between the cam first and second portions at an angle to a radius of the cam lying between the cam first and second portions in the extent of the retreat portion.

5. Apparatus according to claim 1, wherein the valve plate defines a cylindrical inlet valve chamber and a cylindrical outlet valve chamber, duct means communicating between the pump chamber and the inlet and outlet valve chambers, a tube-like inlet valve body removably disposed within the inlet valve chamber, said inlet valve body defining an interior generally conical seating face which communicates between the exterior of the valve plate and the inlet valve chamber and diverges in the direction of fluid flow therethrough from the exterior of the valve plate into the inlet valve chamber, a sphere movably disposed within the inlet valve body adjacent the seating face therein and mating therewith to move away from the seating face and permit fluid flow through the inlet valve body into the pump chamber responsive to increase in volume of the pump chamber and to seat on said seating face and prevent fluid flow out of said pump chamber responsive to decrease in volume of said pump chamber, a tube-like outlet valve body removably disposed within the outlet valve chamber, said outlet valve body defining an interior generally conical seating face which communicates between the exterior of the valve plate and the outlet valve chamber and diverges in the direction of fluid flow therethrough from said outlet chamber to the exterior of the valve plate, a sphere movably disposed within the outlet valve body adjacent the seating face therein and mating therewith to move away from the seating face and permit fluid flow past the seating face from the pump chamber to the exterior of the valve plate responsive to decrease in the volume of the pump chamber and to seat on the seating face and prevent fluid flow into the pump chamber responsive to increase in volume of the pump chamber.

6. Apparatus according to claim 1 wherein the valve plate defines a cylindrical inlet valve chamber and a cylindrical outlet valve chamber; first duct means communicating between the pump chamber and the inlet and outlet valve chambers, said first duct means having a diameter less than the diameter of the inlet and outlet valve chambers whereby first shoulders are defined opening into said valve chambers at the communication of the first duct means with the valve chambers; second duct means extending from the pump chamber into communication with the inlet and outlet valve chambers, said second duct means having a cross-sectional area substantially less than the cross-sectional area of the first duct means and communicating with each of the inlet and outlet valve chambers at the first shoulders; inlet and outlet duct means extending from the inlet and outlet valve chambers, the inlet and outlet duct means having cross-sectional areas less than the diameter of the respective valve chambers whereby second shoulders are provided at the communication of the inlet and outlet duct means spaced apart from the first shoulders of the inlet and outlet valve chambers, respectively; a valve plug disposed in each of the inlet and outlet valve chambers, each plug having an enlarged head engageable with the first and second shoulders of the respective valve chamber, each valve plug having an elongated finger extending from the head and having a cross-sectional area in a plane transverse to the elongate extent of the finger less than the cross-sectional area of either the cross-sectional area of the first duct means or the inlet and outlet duct means communicating with the valve chamber in which the valve plug is disposed, the valve plug having an extent in the direction of the elongate extent of the finger greater than the elongate extent of the valve chamber between the first and second shoulders of said chamber, the finger of the plug disposed in the inlet valve chamber being disposed in engagement with the inlet duct means and the finger of the valve plug disposed in the outlet plug chamber being disposed in engagement with the first duct means, the inlet valve plug being reciprocable within the inlet valve chamber between the first and second shoulders and being engageable with the second shoulder of the inlet valve chamber responsive to decrease in volume of the pump chamber; the outlet valve plug being disposed for reciprocable motion between the first and second shoulders of the outlet valve chamber and being engageable with the first shoulder of the outlet valve chamber responsive to increase in volume of the pump chamber.

7. A proportioning pump comprising a housing, a drive shaft rotatably mounted in the housing, a cam mounted on the drive shaft for rotation with the drive shaft and for sliding movement along the drive shaft, said cam being elongated in the direction of the axis of the drive shaft and having an exterior working surface which has a spiral configuration in a plane perpendicular to the axis of the drive shaft with a retreat portion extending from the outermost radial extent of the spiral inwardly to the innermost radial extent of the spiral, said retreat portion extending the length of the cam and the extent of said retreat portion between the outermost and innermost radial extents of the spiral varying from a maximum extent to a minimum extent along the elongate extent of the cam, a cam follower engaging the working surface of the cam and movably mounted on the housing for reciprocative motion responsive to rotation of the cam, means for yieldably biasing the cam follower against the working surface of the cam, means for moving the cam slidably along the drive shaft and releasably holding it in a preselected position on the drive shaft relative to the drive shaft and to the cam follower, a member mounted on the housing for reciprocative motion and defining a fluid-tight chamber between the housing and the member of variable volume responsive to reciprocative displacement of the member toward and away from the housing, said member being operably connected to the cam follower to be reciprocated thereby, inlet valve means mounted on the housing and communicating from the exterior of the housing to the chamber for opening for fluid flow into the chamber responsive to increase in volume of the chamber and closing to prevent fluid flow out of the chamber responsive to decrease in volume of the chamber, and outlet valve means mounted on the housing and communicating from the exterior of the housing to the chamber for opening for fluid flow out of the chamber responsive to decrease in volume of the chamber and closing to prevent fluid flow into the chamber responsive to increase in volume of the chamber.

8. A proportioning pump comprising a housing, an elongated drive shaft rotatably mounted in the housing, means for connecting the drive shaft to be rotatively driven by a volumetric fluid flow meter, a generally conically shaped cam mounted on the drive shaft for rotation with the drive shaft and for sliding movement along the drive shaft, said cam being elongated in the direction of the longitudinal axis of the drive shaft and having an exterior working surface which has a spiral configuration in a plane perpendicular to the axis of the drive shaft with a retreat portion extending from the outermost radial extent of the spiral inwardly to the innermost radial extent of the spiral, said retreat portion extending the length of the cam and the extent of said retreat portion between the outermost and innermost radial extents of the spiral varying linearly from a maximum extent at one end of the cam to a minimum extent at the other end of the cam, a cam follower engaging the working surface of the cam and movably mounted on the housing for reciprocative motion responsive to rotation of the cam, means for yieldably biasing the cam follower against the working surface of the cam, means for moving the cam slidably along the drive shaft and releasably holding it in a preselected position on the drive shaft relative to the drive shaft and to the cam follower, a flexible diaphragm having its periphery connected to the housing and defining a fluid-tight chamber between the housing and the diaphragm of variable volume responsive to reciprocative displacement of the diaphragm toward and away from the housing, the central portion of said diaphragm being operably connected to the cam follower to be reciprocated thereby, inlet valve means mounted on the housing and communicating from the exterior of the housing to the chamber for opening for fluid flow into the chamber responsive to increase in volume of the chamber and closing to prevent fluid flow out of the chamber responsive to decrease in volume of the chamber, and outlet valve means mounted on the housing and communicating from the exterior of the housing to the chamber for opening for fluid flow out of the chamber responsive to decrease in volume of the chamber and closing to prevent fluid flow into the chamber responsive to increase in volume of the chamber.

9. A proportioning meter-pump comprising a housing, an elongated drive shaft rotatably mounted on the housing and extending exteriorly of the housing, gear means fixed to the drive shaft exteriorly of the housing for connecting the drive shaft to a rotating output shaft of a volumetric fluid flow meter to rotatively drive the drive shaft responsive to fluid flow through the flow meter, a cam on the drive shaft, means for mounting the cam on the drive shaft for rotation of the cam with the drive shaft and for sliding movement of the cam along the drive shaft, said cam being generally conically shaped and elongated in the direction of the longitudinal axis of the drive shaft, the exterior working surface of the cam having a spiral configuration in a plane perpendicular to the axis of the drive shaft with a retreat portion extending from the outermost radial extent of the spiral inwardly to the inner most radial extent of the spiral, said retreat portion extending the length of the cam and lying in a plane in which the axis of the drive shaft lies, the extent of the retreat portion of the cam between the outermost and innermost radial extents of the spiral varying at a uniform rate relative to position along the length of the cam from a maximum at one end of the cam to a minimum at the other end of the cam with the innermost radial extent of the spiral being constant throughout the length of the retreat portion so that the length of the generating radius of the spiral has a rate of change relative to its angular position about the axis of the drive shaft which is a maximum rate of change at the maximum extent of the retreat portion and varies linearly to a minimum rate of change at the minimum extent of the retreat portion, such rate of change being a constant rate of change between the innermost and outermost radial extents of the spiral for any selected position along the length of the cam, a cam follower engaging the surface of the cam and extending radially therefrom, means for slidably mounting the cam follower on the housing for reciprocative motion thereof, spring means yieldably biasing the cam follower against the cam for reciprocative motion of the cam follower responsive to rotation of the cam, an elongated sleeve disposed about the drive shaft and slidably engaging the end of the cam at which the extent of the retreat portion is a maximum, means for maintaining slidable engagement of the cam and the sleeve, said sleeve extending from the cam to the exterior of the housing coaxially with the drive shaft and having external threads along its elongate length, a threaded portion of the housing threadedly engaging the threads on the sleeve so that manual rotation of the portion of the sleeve exterior of the housing results in sliding displacement of the cam along the drive shaft, locking means operative between the sleeve and the housing for releasably securing the sleeve in preselected position relative to the portion of the housing which threadedly receives the sleeve, a dome-shaped flexible diaphragm connected at its periphery to the housing in fluid-tight relation to define a fluid-tight chamber between the concave side of the diaphragm and the housing, said diaphragm being thicker in its central portion than in its peripheral portion so that reciprocation of the central portion of the diaphragm toward and away from the housing results in flexing of the peripheral portion of the diaphragm and the central portion of the diaphragm remains concave toward the housing, means for connecting the cam follower to the central portion of the diaphragm for reciprocative displacement of the diaphragm toward and away from the housing responsive to reciprocative motion of the cam follower to decrease and increase the volume of the chamber defined between the diaphragm and the housing, inlet valve means mounted on the housing and communicating from the exterior of the housing to the chamber for opening for fluid flow into the chamber responsive to increase in volume of the chamber and closing to prevent fluid flow out of the chamber responsive to decrease in volume of the chamber, and outlet valve means mounted on the housing and communicating from the exterior of the housing to the chamber for opening for fluid flow out of the chamber responsive to decrease in volume of the chamber and closing to prevent fluid flow into the chamber responsive to increase in volume of the chamber.

10. A proportioning meter comprising a housing, an elongated drive shaft rotatably mounted on the housing and extending exteriorily of the housing, gear means fixed to the drive shaft for connecting the drive shaft to a rotating member to rotatively drive the drive shaft, a cam on the drive shaft, means for mounting the cam on the drive shaft for rotation of the cam with the drive shaft and for sliding movement of the cam along the drive shaft, said cam being generally conically shaped and elongated in the direction of the longitudinal axis of the drive shaft, the exterior working surface of the cam having a spiral configuration in a plane perpendicular to the axis of the drive shaft with a retreat portion extending from the outermost radial extent of the spiral inwardly to the innermost radial extent of the spiral, the length of the generating radius of the spiral having a constant rate of change relative to its angular position about the axis of the drive shaft from the innermost to the outermost radial extents of the spiral, said retreat portion extending the length of the cam and lying generally in a plane perpendicular to the plane of rotation of the drive shaft, the extent of the retreat portion of the cam between the outermost and innermost radial extents of the spiral varying at a uniform rate relative to position along the length of the cam from a maximum at one end of the cam to a minimum at the other end of the cam with the innermost radial extent of the spiral being constant throughout the length of the retreat portion so that the length of the generating radius of the spiral has a rate of change relative to its angular position about the axis of the drive shaft which is a maximum rate of change at the maximum extent of the retreat portion and varies linearly to a minimum rate of change at the minimum extent of the retreat portion, a cam follower engaging the surface of the cam and extending therefrom, means for movably mounting the cam follower on the housing, means for yieldably biasing the cam follower against the cam for reciprocative motion of the cam follower responsive to rotation of the cam, means for moving the cam slidably along the drive shaft and releasably holding it in a preselected position on the drive shaft relative to the drive shaft and to the cam follower, a dome-shaped flexible diaphragm connected at its periphery to the housing in fluid-tight relation to define a fluid-tight chamber between the concave side of the diaphragm and the housing, means for connecting the cam follower to the central portion of the diaphragm for reciprocative displacement of the diaphragm toward and away from the housing responsive to reciprocative motion of the cam follower to decrease and increase the volume of the chamber defined between the diaphragm and the housing, inlet valve means mounted on the housing and communicating from the exterior of the housing to the chamber for opening for fluid flow into the chamber responsive to increase in volume of the chamber and closing to prevent fluid flow out of the chamber responsive to decrease in volume of the chamber, and outlet valve means mounted on the housing and communicating from the exterior of the housing to the chamber for opening for fluid flow out of the chamber responsive to decrease in volume of the chamber and closing to prevent fluid flow into the chamber responsive to increase in volume of the chamber.

11. A proportioning meter for adding an additive liquid to a flowing base liquid comprising a housing, a drive shaft rotatably mounted in the housing, means for connecting the drive shaft to a rotating output shaft of a volumetric flow meter to rotatively drive the drive shaft responsive to flow of a base liquid through the flow meter, a cam mounted on the drive shaft for rotation with the drive shaft and for sliding movement along the drive shaft, said cam having an exterior working surface which has a spiral configuration in a plane perpendicular to the axis of the drive shaft with a retreat portion extending from the outermost radial extent of the spiral inwardly to the innermost radial extent of the spiral, a cam follower engaging the working surface of the cam and movably mounted on the housing for reciprocative motion responsive to rotation of the cam, means for biasing the cam follower against the working surface of the cam, a member mounted on the housing for reciprocative motion and defining a fluid-tight chamber between the housing and the member of variable volume responsive to reciprocative displacement of the member toward and away from the housing, means for operably connecting the member to the cam follower to be reciprocated thereby, inlet valve means mounted on the housing and communicating from the exterior of the housing to the chamber for opening for flow of an additive liquid into the chamber responsive to increase in volume of the chamber and closing to prevent flow of the additive liquid out of the chamber responsive to decrease in volume of the chamber, and outlet valve means mounted on the housing and communicating from the exterior of the housing to the chamber for opening for flow of the additive liquid out of the chamber responsive to decrease in volume of the chamber and closing to prevent flow of the additive liquid into the chamber responsive to increase in volume of the chamber.

References Cited in the file of this patent
UNITED STATES PATENTS

| | | |
|---|---|---|
| 2,711,134 | Hughes | June 21, 1955 |
| 2,785,628 | Moller | Mar. 19, 1957 |
| 2,957,420 | Reynolds et al. | Oct. 25, 1960 |
| 2,982,447 | Austin | May 2, 1961 |
| 3,000,320 | Ring | Sept. 19, 1961 |
| 3,010,404 | Anderson | Nov. 28, 1961 |